Figure 1:
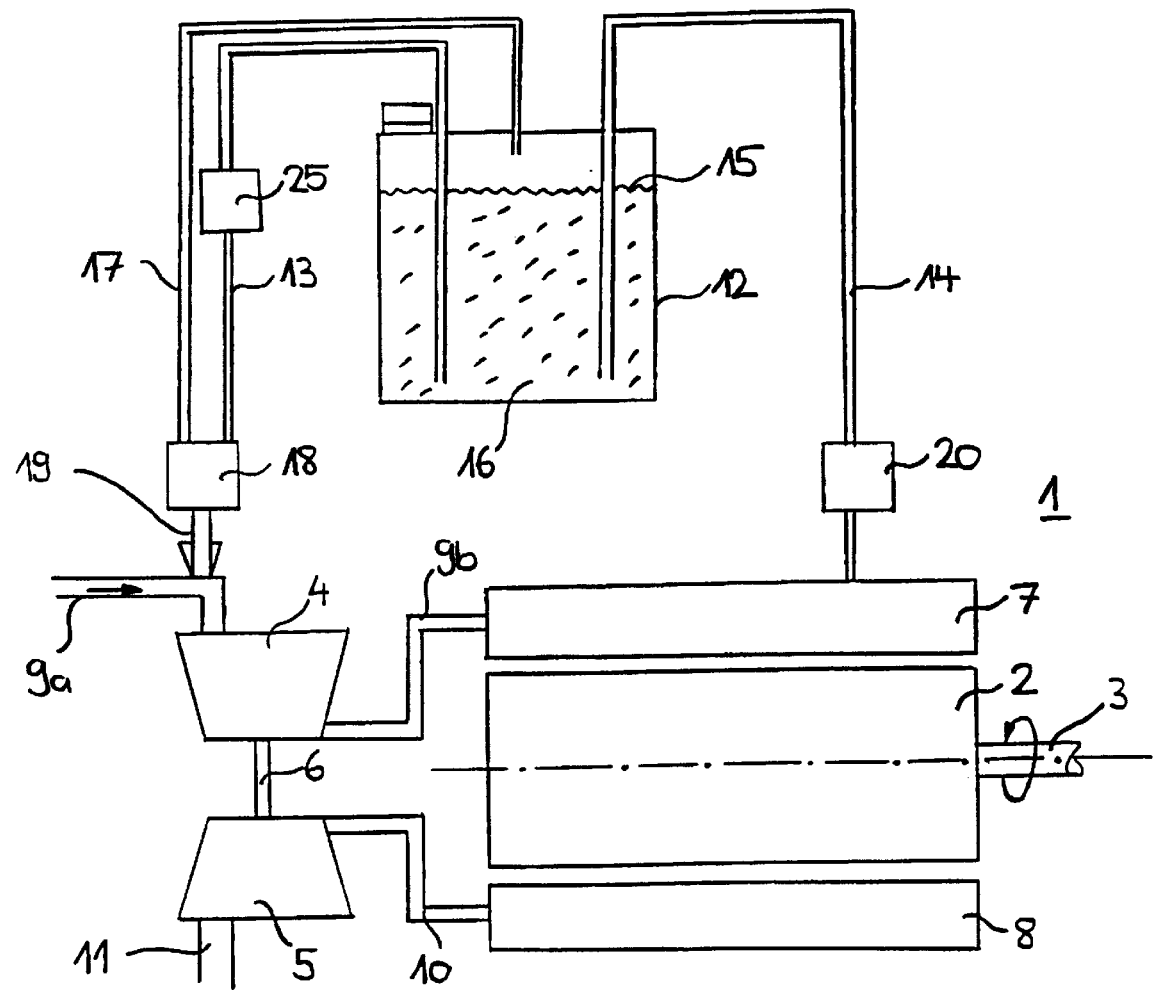

United States Patent [19]
Collin

[11] Patent Number: 6,082,311
[45] Date of Patent: Jul. 4, 2000

[54] DRIVE ARRANGEMENT AND METHOD OF REDUCING THE AMOUNT OF $NO_x$ IN THE EXHAUST GASES FROM AN INTERNAL COMBUSTION ENGINE

[75] Inventor: Lars Thorbjörn Collin, Mölndal, Sweden

[73] Assignee: Lars Collin Consult AB, Molndal, Sweden

[21] Appl. No.: 09/254,203

[22] PCT Filed: Sep. 8, 1997

[86] PCT No.: PCT/EP97/04865

§ 371 Date: Mar. 3, 1999

§ 102(e) Date: Mar. 3, 1999

[87] PCT Pub. No.: WO98/10185

PCT Pub. Date: Mar. 12, 1998

[30] Foreign Application Priority Data

Sep. 9, 1996 [CH] Switzerland ............ 2209/96

[51] Int. Cl.[7] .................................... F02B 47/00
[52] U.S. Cl. .................... 123/25 R; 123/25; 123/4; 123/255; 60/599
[58] Field of Search ............ 123/25 R, 25 A, 123/25 J; 60/599

[56] References Cited

U.S. PATENT DOCUMENTS

| | | | |
|---|---|---|---|
| 3,862,819 | 1/1975 | Wentworth, Jr. ............ | 431/4 |
| 4,014,179 | 3/1977 | Iles et al. ............ | 62/88 |
| 4,440,116 | 4/1984 | Stevenson et al. ............ | 123/25 J |
| 4,630,642 | 12/1986 | Detweiler ............ | 137/506 |
| 4,632,067 | 12/1986 | Carlson ............ | 123/25 A |
| 4,883,023 | 11/1989 | Tsang et al. ............ | 123/25 A |
| 4,960,080 | 10/1990 | O'Neill et al. ............ | 123/25 A |
| 5,125,377 | 6/1992 | Mezheritsky ............ | 123/198 A |
| 5,131,229 | 7/1992 | Kriegler et al. ............ | 60/605.2 |
| 5,657,630 | 8/1997 | Kiemtrup et al. ............ | 60/605.2 |
| 5,758,606 | 6/1998 | Rosen et al. ............ | 123/25 B |
| 5,937,799 | 8/1999 | Binion ............ | 123/25 C |

*Primary Examiner*—Noah P. Kamen
*Assistant Examiner*—Hai Huynh
*Attorney, Agent, or Firm*—Shoemaker and Mattare, Ltd

[57] ABSTRACT

The invention concerns a drive arrangement (1) for the combustion of fuel, with an internal combustion engine (2), an intake air compressor (4) and an exhaust gas turbine (5) which drives the latter. An intake-air distributor (7) is provided between the compressor (4) and the internal combustion engine (2) and an exhaust gas chamber (8) is disposed between the internal combustion engine (2) and the exhaust gas turbine (5). Further provided are a container (12) and a nozzle (18) which is connected thereto via a first water-conveying pressure line (13), the nozzle injecting water into the scavenging air in front of the compressor (4). The internal combustion engine takes the form of a diesel engine (2), and the first pressure line (13) and the nozzle (18) are connected to the intake line (9) in front of a compressor (4) such that the atomizing water is injected into the compressor (4). There is further provided between the distributor (7) and the pressure reservoir (12) a pressure connection for controlling the amount of water to be injected. The invention further concerns a method of reducing the amount of $No_x$ in the exhaust gases in a drive arrangement with an internal combustion engine, wherein atomized water is injected into the scavenging air in front of the compressor (4), and the pressure of the water in the container is determined from the pressure of the supercharged scavenging air.

6 Claims, 1 Drawing Sheet

DRIVE ARRANGEMENT AND METHOD OF REDUCING THE AMOUNT OF $NO_x$ IN THE EXHAUST GASES FROM AN INTERNAL COMBUSTION ENGINE

The invention relates to an engine according to the preamble of patent claim 1 and a method for reducing the amount of $NO_x$ in the exhausts of an internal combustion engine according to the preamble of patent claim 6.

It is generally known that the production of $NO_x$ in the exhausts may be reduced by the supply of water into the intake air or also into the fuel. From GB-A-2 259 326 there is furthermore known a device which describes a water injection system for supercharged motors with a charge cooler. Between the compressor and the motor, parallel to the charge cooler there is provided a pressure conduit which leads to a water tank and from which a pressure conduit via a nozzle opens into the exit channel behind the charge cooler. Behind this connection a throttle valve is provided in the exit channel connected to the motor. The system is used with a carburettor motor and with a fuel injection motor.

With this system water may for example be injected into the Otto motor.

The height of the reduction of $NO_x$ lies normally in the same size ratio as the ratio between the added water and the amount of fuel. Since the fuel quantity may however rapidly vary on account of for example the driving manner as a result of differing transmissions and loading, also the injected quantity of water must quickly adapt to the fuel quantity. In particular during the start and with a low loading a too large quantity of water may heavily compromise the motor power.

The largest component of $NO_x$ is produced at a maximum torque at rotational speeds between 55% and 85% of the maximum rotational speed. With these rotational speeds a sufficient quantity of water must be inputted into the intake air. The reason for the reduction of $NO_x$ is on the one hand the reduced temperature during the working process (by the phase conversion of water into steam, energy is removed from the system, which cools the system and reduces the reaction speed) and on the other hand the slowed down reaction speed on production of $NO_x$ under influence of steam.

With Otto motors with a catalyser which use a Lamda probe, by way of the probe the stochiometric ratio between the air and fuel is controlled. If the intake air is uniformly enriched with water, the water quantity automatically follows the consumed quantity of fuel.

A diesel motor must work with a certain excess of intake air since the fuel injected into the combustion chamber in the short time which is available may not uniformly distribute in the combustion space.

Since this is not the case with diesel motors the injected water quantity should be regulated.

From various publications (for example FR-2,529,950, U.S. Pat. No. 4,630,642, DE-647425, GB-103295 or U.S. Pat. No. 4,632,067) it is known to regulate the quantity of injected water in dependence on the pressure in the intake conduit after the compressor. For this the water in front of the compressor must be brought into the intake air. It has been ascertained that above all with large powers problems occur when water droplets impinge on rotating parts of the compressor. The rotor of the compressor, rotating at high speeds (up to 100,000 r.p.m.) may be damaged by the impinging of water droplets, which reduces the life expectancy of the motor.

It is therefore the object of the present invention to specify a simple engine which is also suitable for diesel motors and effects a quick adaptation of the required quantity of atomising water without damaging, by way of injecting water into the intake air, the rotor of the compressor. A further object of the present invention lies in specifying a method which permits a considerable reduction of the expelled quantity of $NO_x$ with diesel motors.

These objects are solved by an engine with the features of claim 1 and by a method for reducing the quantity of $NO_x$ with the features of patent claim 6.

An engine according to the invention comprises an internal combustion engine and a turbocharger containing a compressor. The compressor via an intake conduit suctions air which is compressed in the compressor and is supplied to the air inlet of the internal combustion engine. The engine furthermore comprises a container which contains water which may be added into the intake air. The pressure of the water in the container is determined by the pressure in the scavenging air between the compressor and the air inlet of the internal combustion engine.

Since the pressure between the compressor and the air inlet depends on the rotational speed of the compressor, thus on the motor power (motor rotational speed, exhaust pressure), the quantity of the added water is automatically adapted to the motor power. The water container is furthermore connected via a water supply to the intake conduit in a manner such that the water may be added to the intake conduit in front of the compressor. The water is atomised into the intake air before the addition. In this manner the risk of erosion and corrosion in the motor is reduced. Furthermore there results a more homogeneous mixing through of the air and the water. According to the invention a combination nozzle is used which atomises the water. The combination nozzle is impinged with the pressure over the water in the water container. This leads to the fact that the size of the water droplets which are produced by the combination nozzle are dependent on the pressure of the intake air between the compressor and the air intlet, this means indirectly on the motor power. The larger the motor power the larger is the scavenging air pressure and the smaller is the diameter of the atomised water droplets. Therein lies the particular advantage of the present invention. The larger is the motor power the quicker rotates the rotor of the compressor. The quicker the rotor of the compressor rotates the smaller are thus the injected water droplets. With this the risk of a damage to the rotor is reduced. The atomised water droplets are atomised, this means they typically comprise a diameter of 0.01 to 0.1 mm. It is essential that the size of the water droplets is selected in dependence on the motor power, or in dependence on the dimensions of the motor. Small water droplets are not only of an advantage with respect to the damage of the rotor. By the spraying of the water to such small droplets the complete droplet surface is increased which simplifies or accelerates the vapourisation procedure. Small water droplets have furthermore the advantage that they better follow the intake airflow and that a depositing of the water droplets on the walls of the conduit for the intake air is avoided. Such small water droplets are rapidly vapourised so that a vapourisation is effected already during the compression procedure in the compressor. The output temperature of the air from the compessor is at the same time reduced which leads to a higher thermodynamic efficiency.

It is thus essential to the invention that the diameter of the water droplets is selected in dependence on the motor power. This is achieved particularly simply by the use of a combination nozzle which is impinged with the pressure (or with a smaller pressure which is proportional to this pressure) in the intake air after the compressor. As a combination nozzle known nozzles, such as they are for example known from air moisturisation are used. The atomisation is effected under the simultaneous air admixture with the swirling of the atomised water in the compressor.

If the water of the intake air is admixed in front of the compressor the temperature increase of the air through the compressor reduces on account of the phase conversion heat and of the higher specific heat capacity of water. With a smaller temperature increase the intake air may be more heavily compressed which (on account of the larger density of the working medium) leads to higher efficiencies. At the same time is has been proved successful to spray atomised water spray directly into the centre of the compressor.

The engine according to the invention comprises a pressure conduit which connects the container to the compressor.

The pressurised air conduit is connected to the pressure container above the level of the water and leads parallel to the first water-conducting pressure conduit to the combination nozzle. With the air which is led to the nozzle the water is atomised so that the danger of damage to the compressor by erosion is reduced.

The pressure in the water may be particularly simply produced when the water container is connected to the intake conduit between the compressor and the air inlet of the motor. Where appropriate in this connection conduit furthermore there may be applied a pressure reduction valve.

It would however also be conceivable to measure the pressure between the compressor and the air inlet of the motor with a measuring arrangement and to produce the pressure in the water with a piston which is actuated in dependence on the measured pressure between the compressor and the air inlet of the motor.

The method according to the invention is based on the fact that the pressure of the water adding to the intake air is determined by the pressure of the compressed intake air, wherein this pressure furthermore is used for atomising the water in a combination nozzle.

The portion of water which is supplied to the fuel does not of course need to remain constant over the whole power spectrum of the motor. Thus for example it is conceivable to stop the supply of water with small loads, for example with starting or on switching. It is commonly essential that sufficient atomised water in front of the compressor is injected into the intake conduit so that the pressure produced with a large torque may be used via the compressor in order to add the water to the intake air and to atomise the water.

In a further particularly preferred embodiment example the pressure in the intake conduit between the compressor and the air inlet of the motor is led directly into the water container via a pressure conduit. It is particularly favourable when the end of the pressure conduit opens below the water level in the water container. With this on the one hand the hot air may be cooled so that damage to subsequent tubing systems which may consist of plastic are avoided. A further advantage of this arrangement lies in the fact that the water in the water container is heated by the warm air so that a freezing in the cold winter times is avoided.

Advantageously to the water there may also be added a means for reducing the freezing point, typically alcohol.

Further advantages of the invention follow from the dependent patent claims and from the subsequent description; in which the invention is described in more detail by way of an embodiment example illustrated in the schematic drawings. There shows:

FIG. 1 an engine for a diesel motor with a pressure container.

In FIG. 1 there is shown an engine 1 with an internal combustion engine 2 for diesel fuel (diesel motor) and a drive shaft 3 coupled to this, a compressor 4 for the intake air and an exhaust turbine 5. The compressor 4 is connected via a shaft 6 to the exhaust turbine 5 and is thus driven by this. Prior to the diesel combustion motor 2 there is arranged an intake air distributor 7 and arranged after, an exhaust chamber 8. The schematically represented exhaust chamber forms the connection between the internal combustion engine and an exhaust conduit. The compressor 4 suctions air via the intake conduit 9a, and via an air intake conduit 9b is connected on the distributor 7. The exhaust chamber 8 is for its part via an exhaust conduit 10 connected to the exhaust turbine 5 from which an exhaust pipe 11 leads into the surroundings.

Furthermore there is provided a pressure container 12 which via a first water-conducting pressure conduit 12 and a combination nozzle 18 in front of the entry of the compressor 4 is connected to the compressor 4 and via a second pressure conduit 14 is connected to the distributor 7. Parallel to the first water-conducting pressure conduit 13 there is provided a pressurised air conduit 17 which with this leads to the combination nozzle 18 which via a further conduit 19 is connected to the intake conduit in front of the compressor. The nozzle 18 serves for spraying or atomising the water so that this water is injected into the intake conduit 9a in front of the compressor 4. In dependence on the pressure after the compressor the droplet size is about 0.01 mm to 0.1 mm. The design of such a nozzle is known with respect to the technology in this field, wherein the nozzle opening determines the degree of mixture and the size of the water droplets. In the second pressure conduit 14 furthermore a pressure reduction valve 20 may be provided. Since for atomising the water a high as possible pressure is advantageous, in general the pressure reduction valve 20 is done away with.

In the water-conducting pressure conduit 13 there may furthermore be applied a pressure-dependent valve 25 which only opens on reaching a certain mimimal pressure. With this it is achieved that with small powers (idling, switching) no water is added to the intake air. With small powers the pressure increase via the compressor may be too small in order to vapourise the water. The second pressure conduit 14 opens below the water level 15 so that this hot air from the intake conduit 9b is cooled and the water 16 in the water container is heated.

The functioning manner of the previously described engine is thus as follows:

By way of the pressure of the exiting exhaust the exhaust turbine 5 is driven and thus via the shaft 6 also the compressor 4. With this the charging pressure in the distributor 7 is achieved. The pressure of the intake air compressed in such a manner is led further into the pressure container 12. If the power of the motor is increased the produced charging pressure increases and the air pressure of the air located in the pressure container 12 above the water level is increased. By way of this more water is led through the first pressure conduit 13 and more water is atomised into smaller droplets and injected into the compressor 4. Furthermore the pressure of the air being led to the nozzle 18 via the conduit 17 increases. This leads to an increased atomisation of the water. Since the charging pressure is dependent on the quantity of the diesel fuel combusted on driving, the quantity of injected water increases in dependence of the fuel quantity and the size of the water droplets increase in dependence on the rotational speed of the rotor of the compressor. Since the compressed intake air effects a pressure increase on the pressure container 12 the pressure of the air located above the water is increased so that a larger atomisation of the water in the nozzle 18 takes place.

What is claimed is:

1. An engine (1) with an internal combustion engine (2) and with a turbocharger, containing a compressor (4) which via an intake conduit (9a) suctions air, wherein the engine (1) comprises a container (12) with water to be added into the intake air, wherein the engine (1) comprises means (14, 13) for producing a pressure in the water, which is determined by the pressure in the intake conduit (9b) between the compressor (4) and the intake air distributor (7), and wherein the container (12) is connected with a water supply (13, 18, 19) for adding water into the intake air to the intake conduit (9a) in front of the compressor (4), characterised in that in the connection conduit (19) between the intake conduit (9a) and the water container (12) there is mounted a combination nozzle (18) for spraying the water into the intake conduit (9a), wherein for the admixture of air and for atomising the water in the combination nozzle (18), above the water level (15) on the pressure container (12) there is connected a pressurised air conduit (17) which, parallel to the first water-conducting pressure conduit (13), leads to the nozzle (18).

2. An engine according to claim 1, characterised in that the water container (16) with a pressure conduit (14) is connected to the intake air distributor (7).

3. An engine according to claim 2, characterised in that the pressure conduit (14) comprises a pressure-reducing valve (20).

4. An engine according to claim 1, characterised in that there is provided a pressure-dependent valve (25) which at a predeterminable water pressure opens the supply of water (13, 18, 19).

5. An engine according to claim 1, characterised in that the pressure conduit (14) opens below the water level (15) in the water container (12).

6. A method for reducing the quantity of $NO_x$ in the exhausts in an engine (1) with an internal combustion engine (2) and a turbocharger, containing a compressor (2) which via an intake conduit (9a) suctions air and which guides the compressed air via an intake conduit (9b) into an intake air distributor (7) of the motor (12), wherein into the intake conduit (9a) in front of the compressor (4) water is injected into the intake air and wherein the pressure of the injected water is determined in dependence on the pressure in the intake air distributor (7), characterised in that the water by way of a combination nozzle (18) is injected atomised into the intake air, wherein the water in the combination nozzle (18) for atomising the water is impinged with the pressure of the intake air distributor.

* * * * *